UNITED STATES PATENT OFFICE.

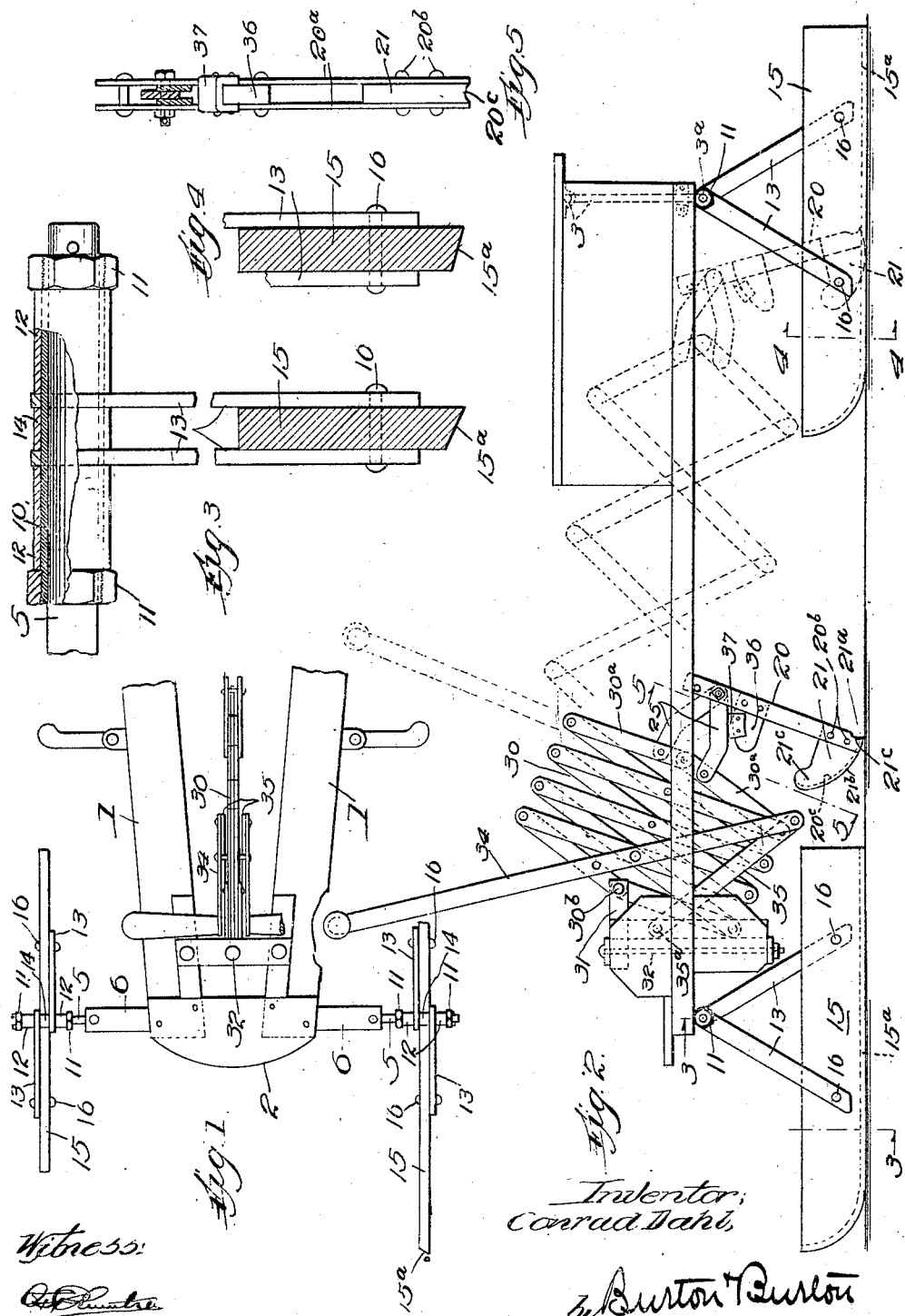

CONRAD DAHL, OF CHICAGO, ILLINOIS.

OCCUPANT-PROPELLED SLIDING VEHICLE.

1,377,402. Specification of Letters Patent. Patented May 10, 1921.

Application filed July 14, 1920. Serial No. 396,201.

*To all whom it may concern:*

Be it known that I, CONRAD DAHL, a citizen of the United States, residing at Chicago, in the county of Cook and the State of Illinois, have invented certain new and useful Improvements in Occupant-Propelled Sliding Vehicles, of which the following is a specification, reference being had to the accompanying drawings, forming a part thereof.

The purpose of this invention is to provide an improved form of runner and propeller for an occupant-propelled sled or other sliding vehicle. It consists in the elements and features of construction and described, as indicated in the claims.

In the drawings:—

Figure 1 is a plan view of a forward end portion with the steering runners of the sliding vehicle constructed according to this invention.

Fig. 2 is a side elevation of such a vehicle.

Fig. 3 is a detail section at the line, 3—3, on Fig. 2.

Fig. 4 is a section at the line, 4—4, on Fig. 2.

Fig. 5 is a section at the line, 5—5, on Fig. 2.

In the drawings there is shown a sliding vehicle designed to be occupant-propelled and having propelling mechanism shown which do not constitute a part of the present invention, being fully shown and described in my co-pending application hereinafter mentioned in connection with the brief description of said mechanism which identifies its location with respect to the specific parts of the construction which constitute the present invention. In the drawing the frame of the vehicle is represented by two longitudinal bars, 1, 1, framed together rigidly by any suitable means represented by a cross bar, 2, at the forward end, and the rigid rear axle, 3, which is shown in arc form, terminating in the spindles, 3ª, 3ª, upon which the rear runners are mounted. The forward runners are adapted for steering the vehicle, and are mounted upon spindles, 5, 5, which are pivoted to the opposite ends of the rigidly attached transverse frame members, 6, 6. No further description of the steering runners, either as to the mounting or means of steering, is required for understanding of the present invention, said steering means constituting no part of said invention. Each of the runners is constructed with a hub for mounting it in lieu of a wheel upon the proper axle spindle, and all the runners are alike in this respect, the hub in each case consisting of a sleeve, 10, exteriorly threaded at its opposite end for receiving the clamping nuts, 11, 11, which are set up against the spacing sleeves, 12, 12, for clamping them against runner-carrying arms or spokes, 13, 13; which are themselves spaced apart by a sleeve, 14, as seen in Fig. 3. These spoke arms, clamped and spaced as described by means of the spacing sleeves mentioned upon the hub sleeve, 10, extend divergent radially for securement to the runner, 15, the two spoke members being applied, and bolted on opposite sides of the runner as seen at 16 in Fig. 3. Each runner, 15, is designed to be made of metal plate and curved as usual at the forward end, and transversely beveled on the running edge, as seen at 15ª, in Fig. 3. For presenting an acute-angled longitudinal corner to the roadway, adapted to prevent lateral sliding or skidding, and the two opposite runners of each pair having their running edges oppositely beveled so that they present vertical surfaces which form the acute-angled corners, in opposite directions for preventing skidding in both directions. Preferably the vertical surfaces of the acute-angled corners of the runner edge are the outer surfaces of the runners respectively.

The propeller consists of a leg, 20, having a foot, 21, which has an acute-angled heel as seen at 21ª, and a bottom curved in an arc whose radius shortens from being initially substantially the length of the radius of swing of the leg to substantially less than that length as seen at 21ᵇ, terminating in a bluntly rounded toe as seen at 21ᶜ. The leg is made of two flat bars, 20ª, 20ª, between which the foot block, 21, is secured at the lower end of the leg, the securement being preferably in a permanent manner as by rivets, 20ᵇ. The foot hollowed transversely at the bottom around the entire curve thereof as seen at 20ᶜ, to give it acute-angled lateral edges causing it to hold its course in its return slide. The curve of the bottom makes substantially a right angle with a line from the heel to the pivot about which the leg swings in the propelling movement; to give the heel an acute angle the rear edge of the foot block is cut back as seen at 21ᶜ, the rear edges of the lapping ends of the leg bars being similarly notched as seen at the same point.

The leg is pivotally carried at its upper end by a pair of links, 25, 25, which project respectively from the two lever members, 30ᵃ, 30ᵃ, of the rearmost lever couple of a lazy-tongs propelling device, 30, which is mounted by the foremost pivot, 30ᵇ, on a head, 31, vertically pivoted to the frame structure at a pivot bolt or king pin, 32. The lazy-tongs is extended for propelling the vehicle by means of an operating lever, 34, which has a swinging fulcrum support afforded by the lower rear ends of the links, 35, pivoted at their upper forward ends to the head at 35ᵃ, said operating lever engaging an intermediate pivot,—as the second from the front—of the lazy-tongs for extending the latter. This propelling mechanism is fully described in my co-pending application, Serial No. 396,202, filed July 14, 1920, and requires no further description here, but it has a special utility in conjunction with the propelling leg for engaging the ground or ice, as differentiated from a wheel, as hereinafter pointed out.

A forwardly-projecting bracket-stop, 36, on the leg is stopped against the lower link, 25, at the rearwardly-inclined position of the leg which is effective for ground engagement of the heel, 21ᵃ, for propulsion. 37 is a cushion on the bracket, 36, for preventing unpleasant clack of encounter of the bracket, 36, with the link, 25.

A very important feature of this invention as presented in the construction shown, is that the ice or ground-engaging propeller at its ground- or ice-engaging position is inclined,—that is, has the line from its pivot to the point of ground- or ice-engagement inclined,—rearwardly from its engaged point upward to its pivot. In devices for like purposes heretofore, so far as I am aware, the propelling device when designed to engage the ground with a rearward thrust for giving forward propulsion, has either been inclined down rearwardly, that is, in the direction of the propelling thrust throughout its entire propelling stroke, or pivoted for swinging in an arc in which after a short portion of said stroke it reaches a position of downward rearward inclination, and makes the remainder of the stroke increasingly thus inclined. Such construction I have found imperfectly effective, for the reason that the direction of movement of the propeller about its pivot as the vehicle moves forward under the propelling thrust while the propeller point remains at the point at which it has engaged the ground or ice for giving the thrust is upward, and tends to cause, or readily permits, the disengagement of the propeller point from the ground or ice when the latter cracks or yields at the point of engagement. But, on the contrary, with the construction shown, as above pointed out, in which the propeller is pivoted at a position rearward of its ground-engaging point, and is therefore inclined down forward of its pivot to its ground engagement, the swing of the propeller about its pivot as the vehicle goes forward under the thrust is downward relatively to the pivot; so that though the ground or ice may crack or yield at the point of engagement, the propeller tending to move downward tends constantly to take a new hold and maintain the propulsion neither escaping from the ground nor ceasing to propel the vehicle. The operating parts of the propeller are designed and mounted on the vehicle with a view to the advantage pointed out.

I claim:—

1. In combination with a vehicle adapted to be propelled by rearward thrust of the ground-engaging means, a propeller pivotally carried in the vehicle frame and inclined down forwardly from its pivot to its ground engagement, structure on which the propeller pivot is supported for backward and forward movement bodily on the vehicle without reversal of inclination during said backward movement, and means for giving such pivot support such movement.

2. In the construction defined in claim 1, foregoing, the pivot-supporting means being mounted on the vehicle with freedom for upward movement of the propeller pivot as the propeller swings about its pivot from inclined toward vertical position.

3. In the construction defined in claim 1, foregoing, the propeller being free to swing about its pivot upon reversal of the direction of thrust from operative position inclined up rearwardly to trailing position inclined down rearwardly.

4. In a slidingly propelled vehicle, an ice or ground-engaging device consisting of a pendant fore-and-aft swinging leg, having a foot projecting therefrom in the plane of swing of the leg, said foot having its rounded edge curved in an arc whose radius is initially substantially equal to and gradually becomes substantially less than the radius of swing of the leg and which terminates in an abruptly rounded toe.

5. In a slidingly propelled vehicle, an ice or ground-engaging device consisting of a pendant fore-and-aft swinging leg, having a foot projecting substantially in the plane of swing of the leg, comprising two ribs or flanges laterally spaced apart and a part to which they are laterally applied for so spacing them.

6. The construction defined in claim 4, the foot having an acute angle at its heel produced by cutting the rear edge of the foot flange back from the line of the radius of the initial part of the curve of the ground-engaging edge of the foot.

7. In an occupant-propelled sliding vehicle, oppositely-positioned runners having their sliding edges oppositely beveled to present acute-angled longitudinal corners to the roadway, of which one side is a vetical surface of the runner.

8. In the construction defined in claim 7 foregoing, the vertical surface of the acute-angled corners being in each runner the outer surface thereof.

In testimony wherof I have hereunto set my hand at Chicago, Illinois, this twelfth day of July, 1920.

CONRAD DAHL.